US011892618B2

(12) United States Patent
Siebenmorgen et al.

(10) Patent No.: US 11,892,618 B2
(45) Date of Patent: Feb. 6, 2024

(54) OPTICAL ARRANGEMENT AND METHOD FOR LIGHT BEAM SHAPING FOR A LIGHT MICROSCOPE

(71) Applicant: Carl Zeiss Microscopy GmbH, Jena (DE)

(72) Inventors: Jörg Siebenmorgen, Jena (DE); Ingo Kleppe, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 683 days.

(21) Appl. No.: 17/045,701

(22) PCT Filed: Apr. 11, 2019

(86) PCT No.: PCT/EP2019/059191
§ 371 (c)(1),
(2) Date: Oct. 6, 2020

(87) PCT Pub. No.: WO2019/206649
PCT Pub. Date: Oct. 31, 2019

(65) Prior Publication Data
US 2021/0096358 A1 Apr. 1, 2021

(30) Foreign Application Priority Data

Apr. 26, 2018 (DE) ...................... 10 2018 110 109.0

(51) Int. Cl.
G02B 27/28 (2006.01)
G02B 26/06 (2006.01)
G02B 6/27 (2006.01)
(52) U.S. Cl.
CPC ........... *G02B 26/06* (2013.01); *G02B 6/2773* (2013.01); *G02B 27/283* (2013.01)

(58) Field of Classification Search
CPC .... G02B 26/06; G02B 6/2773; G02B 27/283; G02B 5/30; G02B 5/3016; G02B 5/3025;
(Continued)

(56) References Cited

U.S. PATENT DOCUMENTS

2007/0247691 A1 10/2007 Obrebski et al.
2009/0180181 A1 7/2009 Oakley
(Continued)

FOREIGN PATENT DOCUMENTS

DE 10 2009 036 566 A1 2/2011
DE 11 2014 001 820 T5 12/2015
(Continued)

OTHER PUBLICATIONS

German Search Report for Priority DE 10 2018 110 109.0 dated Dec. 14, 2018.
(Continued)

*Primary Examiner* — Arnel C Lavarias
(74) *Attorney, Agent, or Firm* — Duane Morris LLP

(57) ABSTRACT

A light beam shaping arrangement for a light microscope has a first and a second liquid crystal region or lifting micromirror region, each of which has a plurality of independently switchable liquid crystal elements or mirrors with which a phase of incident light is changeable in a settable manner, an input-/output-coupling polarization beam splitter, a polarization beam splitter arranged between the input-/output-coupling polarization beam splitter and the liquid crystal regions or lifting micromirror regions such that the polarization beam splitter separates the light coming from the input-/output-coupling polarization beam splitter in a polarization-dependent manner into a first partial beam. The first partial beam is directed to the first liquid crystal region or lifting micromirror region, and into a second partial beam, which is directed to the second liquid crystal region or lifting
(Continued)

micromirror region, and the two partial beams returning from the liquid crystal regions and directs them together as an outgoing light beam.

12 Claims, 1 Drawing Sheet

(58) Field of Classification Search
CPC .. G02B 5/3083; G02B 21/00; G02B 21/0004; G02B 21/0032; G02B 21/0092; G02B 21/06; G02B 27/28; G02B 27/281; G02B 27/285; G02B 27/286; G02B 6/2766
USPC ....... 359/368, 362, 363, 369, 385, 386, 388, 359/390, 483.01, 485.01, 489.01, 489.07, 359/489.08, 489.09, 489.2; 349/1, 193, 349/196, 96
See application file for complete search history.

(56) References Cited

U.S. PATENT DOCUMENTS

| | | | |
|---|---|---|---|
| 2009/0284708 A1* | 11/2009 | Abdulhalim | B82Y 20/00 359/260 |
| 2021/0132354 A1* | 5/2021 | Siebenmorgen | G02F 1/0136 |
| 2021/0247600 A1* | 8/2021 | Siebenmorgen | G02B 21/367 |

FOREIGN PATENT DOCUMENTS

| | | |
|---|---|---|
| DE | 11 2014 001 841 T5 | 1/2016 |
| DE | 102018110072 A1 * | 10/2019 |
| EP | 3 190 448 A1 | 7/2017 |
| JP | 2008 276043 A | 11/2008 |
| WO | 2005/122876 A1 | 12/2005 |
| WO | 2008/095609 A1 | 8/2008 |

OTHER PUBLICATIONS

Translation of Written Opinion of the International Searching Authority for PCT/EP2019/059191 dated Aug. 7, 2019.
Jesacher, Alexander, et al.; Near-perfect hologram reconstruction with a spatial light modulator; Optics Express 2008; 16(4):2597-2603.
Jesacher, Alexander; "Applications of Spatial Light Modulators for Optical Trapping and Image Processing", Thesis for Doctorate May 31, 2007; 1-134, 2007.
Van Putten, E.G., et al.; "Spatial amplitude and phase modulation using commercial twisted nematic LCDs"; Applied Optics 2008; 47(12):2076-2081.
Kenny, F., et al.; "Adaptive optimisation of a generalised phase contrast beam shaping system"; Optics Communications 2015; 3(42):109-114.
Davis, Jeffrey A., et al.; "Encoding amplitude information onto phase-only filters"; Applied Optics 1999; 38(23):5004-5013.
Zhu, Long, et al.; "Arbitrary Manipulation of Spatial Amplitude and Phase Using Phase-Only Spatial Light Modulators"; Scientific Reports 2014; 4:7441; 1-7.
Saito, Mitsunori, et al.; "Tunable retarder made of pentaprisms and liquid crystal"; Proc. of SPIE 2011; 8114:811412-1-811412-12.
Meadowlark Optics; "Spatial Light Modulators—XY Series"; Datasheet; 1-12, 2020.

* cited by examiner

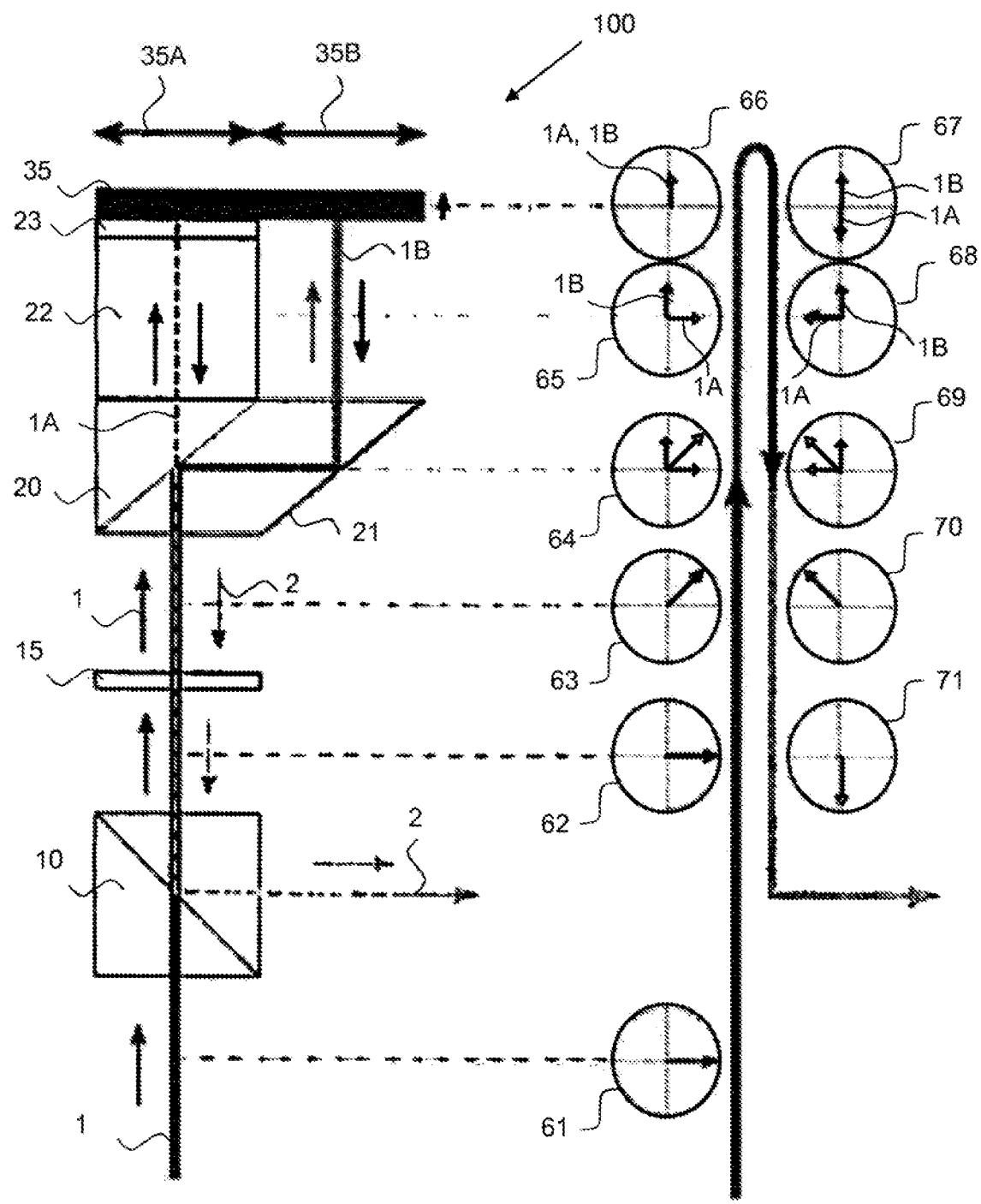

OPTICAL ARRANGEMENT AND METHOD FOR LIGHT BEAM SHAPING FOR A LIGHT MICROSCOPE

RELATED APPLICATIONS

The present application is a U.S. National Stage application of International PCT Application No. PCT/EP2019/059191 filed on Apr. 11, 2019 which claims priority benefit of German Application No. DE 10 2018 110 109.0 filed on Apr. 26, 2018, the contents of each are incorporated by reference in their entirety.

FIELD OF THE INVENTION

In a first aspect, the present invention relates to an optical arrangement for light beam shaping for a light microscope.

In a second aspect, the invention relates to a method for light beam shaping for a light microscope.

BACKGROUND OF THE INVENTION

For beam shaping, in particular spatial light modulators (SLM) are used, which changeably set the phase or amplitude, and thus intensity, of a light beam. For example, a Gaussian laser beam can be converted into a Bessel beam using an SLM. For this purpose, the wavefront of the laser beam is modified by shifting the phase differently over the beam cross section. Light beam shaping can be desired for both illumination and detection light.

An optical arrangement of the generic type for light beam shaping for a light microscope comprises a first liquid crystal region or lifting micromirror region which comprises a plurality of liquid crystal elements or mirrors which are switchable independently of one another and by means of which a phase of incident light is changeable in a settable manner. A corresponding generic method for light beam shaping for a light microscope comprises phase modulation of light by means of a liquid crystal or lifting micromirror matrix, which has a plurality of independently switchable liquid crystal elements or mirrors.

A lifting micromirror region comprises a plurality of mirrors that can be adjusted in their lift (that is, in a direction perpendicular to the mirror surface) independently of one another. This changes a path length that incident light traverses and thus changes the phase of the light.

A phase modulation for light of a specific polarization direction can be achieved with a liquid crystal-based SLM. The polarization component that is perpendicular to this is not influenced. It is desirable to be able to shape a light beam as variably as possible, that is to say to be able to variably set the phase and also the amplitude over the beam cross section. This should be done if possible with a compact, stable, and inexpensive arrangement.

Specifying an optical arrangement and a method which enable variable light beam shaping particularly efficiently and in a particularly simple manner can be regarded as an object of the invention.

This object is achieved by the optical arrangement and by the method, having the features set forth in the annexed claims.

SUMMARY OF THE INVENTION AND DESCRIPTION OF EMBODIMENTS

Advantageous variants of the optical arrangement according to the invention and of the method according to the invention are subjects of the dependent claims and will additionally be explained in the description that follows.

In the case of the optical arrangement of the type mentioned above, a second liquid crystal region or lifting micromirror region that has a plurality of independently switchable liquid crystal elements/mirrors with which a phase of incident light is changeable in a settable manner is provided according to the invention. An input-/output-coupling polarization beam splitter is provided with which incident light of a specific polarization direction is able to be directed in the direction of the liquid crystal regions or lifting micromirror regions. In addition, a polarization beam splitter is arranged between the input-/output-coupling polarization beam splitter and the liquid crystal regions or lifting micromirror regions. The polarization beam splitter separates the light coming from the input-/output-coupling polarization beam splitter, depending on the polarization, into a first partial beam, which is directed to the first liquid crystal region or lifting micromirror region, and into a second partial beam, which is directed to the second liquid crystal region or lifting micromirror region. In addition, the polarization beam splitter combines the two partial beams coming back from the liquid crystal regions or lifting micromirror regions and directs them together to the input-/output-coupling polarization beam splitter as an outgoing light beam. The further transmission of the outgoing light beam at the input-/output-coupling polarization beam splitter depends on the polarization direction of the outgoing light beam.

In a corresponding manner, the method of the abovementioned type according to the invention comprises the following steps:

further guiding light of a specific polarization direction by means of an input-/output-coupling polarization beam splitter;

splitting the light coming from the input-/output-coupling polarization beam splitter in a polarization-dependent manner into a first partial beam and a second partial beam by means of a polarization beam splitter;

wherein the phase modulation of light by means of a liquid crystal matrix or lifting micromirror matrix comprises:

directing the first partial beam to a first liquid crystal region or lifting micromirror region of the liquid crystal matrix or lifting micromirror matrix; and directing the second partial beam to a second liquid crystal region or lifting micromirror region;

combining the two partial beams returning from the liquid crystal regions or lifting micromirror regions by means of the polarization beam splitter; and directing the combined partial beams as an outgoing light beam to the input-/output-coupling polarization beam splitter.

Accordingly, light is divided into two partial beams that are linearly polarized perpendicular to one another. These two partial beams are phase-modulated independently of one another by the two liquid crystal regions or lifting micromirror regions. The two partial beams are then reunited, which means that this outgoing light beam is firstly phase-modulated and, secondly, the polarization/polarization direction thereof can be changed thereby: Depending on the phase modulation of the two partial beams, the outgoing light beam can in particular be linearly polarized with a polarization direction that is rotated with respect to the original light, in particular through 90°. In the case of other phase differences, the light beam going out of the input-/output-coupling polarization beam splitter is elliptically polarized. This change in polarization decides the proportions of the outgoing light beam that are transmitted or reflected at the input-/output-coupling polarization beam splitter. The transmitted or reflected beam component consequently has a changed intensity (/amplitude), which is set by the two liquid crystal regions or lifting micromirror regions. As an advantage, both the phase and the amplitude of a light beam can thus be set variably over its cross section. The phase and the amplitude can be set here independently of each other.

A liquid crystal region or lifting micromirror region can be formed as a liquid crystal region in which the individual liquid crystal elements can be driven by a voltage. A rotation of the molecules of a liquid crystal element is brought about in dependence on the driving, whereby a phase of the light passing through is changeable. Alternatively, a liquid crystal region or lifting micromirror region can be formed as a lifting micromirror region that comprises a plurality of mirrors which are adjustable independently of one another. The mirrors are arranged next to one another and each adjustable in the lifting direction, that is to say, in a direction perpendicular to the mirror surface. This changes the geometric path length that the incident light travels and thus also changes the light phase. Therefore, a liquid crystal region or lifting micromirror region causes a phase change of the light regardless of its specific design. For the sake of simplicity, the following shortened terms will be generally used: liquid crystal region/liquid crystal matrix/liquid crystal element, which are representative of: liquid crystal region or lifting micromirror region/liquid crystal matrix or lifting micromirror matrix/liquid crystal element/mirror. A difference between a liquid crystal region and a lifting micromirror region can be that, typically, a liquid crystal region variably phase-modulates only light of a specific polarization direction, while a lifting micromirror region usually works independently of polarization. However, it is also possible to use special liquid crystal regions that allow variable phase modulation for any polarization.

In a variant of the invention, the first and second liquid crystal regions are regions of the same liquid crystal matrix. Using only one rather than two liquid crystal matrices can significantly reduce the overall costs. In addition, typical liquid crystal matrices have a high number of pixels (=number of liquid crystal elements), which means that a single liquid crystal matrix may suffice. The two partial beams are then incident on two non-overlapping regions. Liquid crystal matrices are often not square, that is to say they have a larger dimension or more liquid crystal elements in one direction than in the other direction. It is precisely then that a single liquid crystal matrix is particularly suitable for shaping both partial beams.

However, a single liquid crystal matrix offers variable phase modulation only for light of a specific polarization direction. However, the two partial beams are initially polarized perpendicular to one another. The polarization of at least one of the partial beams must therefore be rotated so that both partial beams have the same polarization. For this purpose, a polarization rotator can be arranged between the polarization beam splitter and the first liquid crystal region and/or between the polarization beam splitter and the second liquid crystal region. The polarization rotator is intended to bring about a 90° rotation of the polarization direction and can, for example, be a half-wave retardation plate, which retards a polarization component of the incident partial beam by half a wavelength, whereby the polarization direction of said partial beam rotates through 90°.

The partial beam traveling from the polarization rotator to the liquid crystal matrix is incident on the polarization rotator again on the way back from the liquid crystal matrix, and a 90° polarization rotation takes place again and the original polarization direction is attained again directly downstream of the polarization rotator. When said partial beam is incident on the polarization beam splitter again, it thus has no other polarization direction than at the beginning. Rather, the polarization rotator has the effect that a single liquid crystal matrix can be used for two partial beams of different polarization.

For a high beam quality of the outgoing light beam, which is composed of the two partial beams, both partial beams should have travelled the same optical path length. For this purpose, at least one transparent retardation element can be arranged between the polarization beam splitter and the first liquid crystal region and/or between the polarization beam splitter and the second liquid crystal region. The retardation element can be designed such that an optical path length from the polarization beam splitter to the first liquid crystal region is equal to an optical path length from the polarization beam splitter to the second liquid crystal region. The retardation element can in particular comprise a glass block. Alternatively, the geometric path lengths on the separate beam paths to the first and second liquid crystal regions can also be different and be selected such that the optical path lengths are the same.

A beam path from the polarization beam splitter to the first liquid crystal region can be designed in such a way that the first partial beam is incident perpendicularly on the first liquid crystal region and travels back to the polarization beam splitter along the same path. Likewise, a beam path from the polarization beam splitter to the second liquid crystal region can be designed such that the second partial beam is incident perpendicularly on the second liquid crystal region and travels back to the polarization beam splitter along the same path. By being incident perpendicularly on the liquid crystal regions, a better beam quality can be achieved compared to an oblique incidence. Since the two partial beams each have the same path from the polarization beam splitter to the respective liquid crystal region and back, the total number of elements and the space requirement can be low.

The polarization beam splitter can in particular be arranged in such a way that the transmitted light beam is incident perpendicularly on the associated liquid crystal region without further deflection.

The polarization beam splitter can also be designed such that the first and second partial beams leave the polarization beam splitter parallel to one another and travel parallel to one another toward the liquid crystal regions. For this purpose, one of the partial beams is deflected again within the polarization beam splitter. For example, similar to a beam splitter cube, the polarization beam splitter can consist of two connected elements, wherein a polarization-dependent splitting into the two partial beams takes place at the interface between the elements. The two partial beams now travel perpendicularly to one another within the two elements. One of the elements is designed such that the partial beam passing through it is also reflected. In particular, an outer face of this element can be at an angle of 45° relative to the propagation direction of the traversing partial beam, with the result that the partial beam is reflected by 90° at this outer face. The outer face can either be made reflective or total internal reflection can take place. Due to the deflection by 90°, both partial beams leave the polarization beam splitter in parallel. Of the two elements, in particular one can have a triangular shape in cross section and the other element can have a parallelogram shape. Since one side of the triangular shape is unused, this side shape can in principle be arbitrary.

At least two, in particular all, of the following components can be arranged in such a way that they touch each other directly, without an air gap: the polarization beam splitter, the polarization rotator, the liquid crystal matrix, and optionally the retardation element. This can be advantageous for a compact, stable construction and a high beam quality.

It can be desirable for the polarization beam splitter to separate light into the first and second partial beams in equal proportions. For this purpose, the polarization direction of the incident light must be set accordingly. This can be done using a front polarization rotator, which is arranged between the input-/output-coupling polarization beam splitter and the polarization beam splitter and which is oriented such that it rotates the light to the desired polarization direction. The designation "front" polarization rotator is intended to distinguish this polarization rotator from the other polarization rotator upstream of the liquid crystal matrix; as for the rest, both polarization rotators can be formed identically, for example each by a λ/2 plate. In principle, the front polarization rotator can be dispensed with if the input-/output-coupling polarization beam splitter and the polarization beam splitter are appropriately rotated with respect to one another, for example rotated through 45° with respect to one another. That is to say, light reflected or transmitted at the input-/output-coupling polarization beam splitter should be incident on the polarization beam splitter in a way such that it is not completely reflected or transmitted, but is preferably 50% reflected and 50% transmitted.

In the following, explanations are given how an amplitude variation is effectuated from the phase retardations that can be set with the liquid crystal matrix. The amplitude variation is possible pixel-by-pixel over the beam cross section. A phase retardation by which a phase of incident light is influenced is settable individually for each liquid crystal element. An electronic control unit for setting a light intensity to be output is configured to variably set a phase difference between a phase retardation that is generated by a liquid crystal element of the first liquid crystal region and a phase retardation that is generated by a corresponding liquid crystal element of the second liquid crystal region. A liquid crystal element of the first liquid crystal region and a corresponding liquid crystal element of the second liquid crystal region should be understood to mean that the portions of the two partial beams that are guided via these two liquid crystal elements then overlap. The mutually corresponding liquid crystal elements accordingly have matching positions with respect to the respectively incident partial beam. Two phase retardations can be set with the two mutually corresponding liquid crystal elements. The difference between these phase retardations (hereinafter phase difference) is important for the amplitude variation: The phase difference determines how a polarization direction of the combined light beam, which is formed from the two phase-modulated partial beams, is changed or rotated. Depending on the change in the polarization direction, the outgoing light beam is partly reflected and partly transmitted at the input-/output-coupling polarization beam splitter.

For a maximum light intensity, the phase difference can be set to half a light wavelength, as a result of which the outgoing light beam has a polarization direction that is rotated through 90° compared to the incoming light and is therefore not directed at the input-/output-coupling polarization beam splitter in the direction from which the incoming light has come.

For a minimum light intensity, the phase difference can be set to 0 or an integer multiple of the light wavelength, with the result that the outgoing light beam has the same polarization direction as the incoming light and is thus directed at the input-/output-coupling polarization beam splitter in the direction from which the incoming light has come. In order to set any light intensity between 0% and 100% for the portion of the outgoing light beam that is reflected or transmitted by the input-/output-coupling polarization beam splitter, a corresponding phase difference at the liquid crystal matrix is specified.

In addition to the intensity modulation, a phase modulation is also set. For a phase modulation, the liquid crystal elements of the same liquid crystal region are set differently. Accordingly, a phase retardation by which a phase of incident light is influenced is settable individually for each liquid crystal element. A control unit or the control unit for setting a phase pattern over a beam cross section is configured to set different phase retardations with the liquid crystal elements of the same liquid crystal region.

In the following, explanations are given how the control unit can set both an intensity pattern and a phase pattern at the same time. The control unit can set at the liquid crystal elements of the first liquid crystal region mutually different phase retardations, which together help form the phase pattern. Phase retardations are now set at the liquid crystal elements of the second liquid crystal region that are composed of:

A) phase retardations that correspond to those of the liquid crystal elements of the first liquid crystal region for forming the phase pattern, and B) phase differences to the respective phase retardations of the first liquid crystal region for forming the intensity pattern.

The invention additionally relates to a light microscope having an optical arrangement as described here. The optical arrangement can be arranged in the illumination beam path, so that the light influenced by the optical arrangement is then directed into a specimen region. Alternatively or in addition, the or a further optical arrangement can also be arranged in the detection beam path, whereby specimen light is influenced by the optical arrangement before it is incident on a light detector.

The properties of the invention described as additional optical arrangement features are also to be interpreted to be variants of the method according to the invention, and vice versa.

BRIEF DESCRIPTION OF THE DRAWINGS

Further advantages and features of the invention will be described below with reference to the appended schematic figure. Here:

FIG. 1 shows a schematic illustration of an exemplary embodiment of an optical arrangement according to the invention.

DETAILED DESCRIPTION OF THE DRAWINGS

FIG. 1 shows an exemplary embodiment of an optical arrangement 100 according to the invention for shaping light beams in a light microscope according to the invention. The right-hand part of FIG. 1 indicates how the polarization directions of light are changed as it passes through the optical arrangement 100.

The optical arrangement 100 allows phase modulation and amplitude modulation of light. The two modulations can take place independently of one another and pixel-by-pixel over a beam cross section. Light 1, for example laser light, from a light source (not shown here) of the light microscope is directed to the optical arrangement 100. The latter comprises at least one or exactly one liquid crystal matrix or lifting micromirror matrix 35, with which the incident light is modulated. Finally, a modulated outgoing light beam 2 leaves the optical arrangement 100.

The liquid crystal matrix or lifting micromirror matrix 35 comprises a plurality of liquid crystal elements or mirrors that are switchable independently of one another.

In the following text, a design with a liquid crystal matrix with liquid crystal elements is described for the sake of easier comprehension. However, substantially the same construction can also be used for a design with a lifting micromirror matrix.

Light of a certain polarization direction is variably phase-retarded by the liquid crystal elements in dependence on their switching state. This alone can initially only achieve phase modulation. Amplitude modulation is brought about from the interaction of the components of the optical arrangement 100, as will be explained below.

Light 1 is first incident on a polarization beam splitter 10, which is referred to here as an input-/output-coupling polarization beam splitter 10. The input-/output-coupling polarization beam splitter 10 can be, for example, a polarization beam splitter cube which reflects or transmits light in dependence on the polarization. In the example shown, transmitted light is directed to the further components of the optical arrangement 100, while light 1 that was possibly reflected at the input-/output-coupling polarization beam splitter 10 is no longer used in the optical arrangement 100 (in FIG. 1, incident light 1 that is reflected at the input-/output-coupling polarization beam splitter 10 would leave the arrangement to the left). Conversely to the case shown, however, light that was reflected at the input-/output-coupling polarization beam splitter 10 could also be directed to the further components of the optical arrangement 100, while transmitted light would not be used any further.

The light 1 can be linearly polarized with a polarization direction through which the entire light 1 is transmitted at the input-/output-coupling polarization beam splitter 10 to the remaining components. Alternatively, unpolarized light can also be used, whereby the light 1 transmitted by the input-/output-coupling polarization beam splitter 10 is polarized. This polarized light 1 is to be split into two partial beams 1A and 1B, which is done with a further polarization beam splitter 20. A polarization rotator 15 can be present between the two polarization beam splitters 10, 20 so that the light polarization is rotated such that the polarization beam splitter 20 outputs two partial beams 1A and 1B with the same intensity.

In the example illustrated, the polarization beam splitter 20 has a shape such that one of the partial beams 1B is reflected again at an interface 21 of the polarization beam splitter 20, as a result of which the two partial beams 1A and 1B leave the polarization beam splitter 20 parallel to one another. Alternatively, further mirrors or prisms can also be used in order to divert the partial beam 1A and/or 1B in such a way that both are incident on the same liquid crystal matrix but on different liquid crystal regions 35A and 35B. In this way, the two partial beams 1A and 1B can experience different phase modulations that are independent of one another.

Since a liquid crystal matrix 35 can generally only variably phase-modulate light of a specific polarization direction, a polarization rotator 23 is used, which rotates the polarization of one of the partial beams 1A through 90°.

In the example shown, a transparent retardation element 22 is also used between the polarization beam splitter 20 and the liquid crystal matrix 35, so that the beam paths of both partial beams 1A and 1B have the same optical path length. At the liquid crystal matrix 35, incident light passes through the liquid crystal layer, is reflected on its rear side and passes through the liquid crystal layer again before it emerges (phase-retarded). As shown, both partial beams can be directed perpendicularly onto the liquid crystal matrix 35, whereby the partial beams 1A and 1B travel on from the liquid crystal matrix 35 along the same path back to the polarization beam splitter 20, where they are combined again to form a light beam 2, which travels on to the input-/output-coupling polarization beam splitter 10. Depending on the polarization direction now present, the returning light 2 is either transmitted or reflected, or partially transmitted and partially reflected, at the input-/output-coupling polarization beam splitter 10. A polarization rotation is achieved by setting different phase retardations for the two partial beams at the liquid crystal matrix.

The change in polarization of the light as it travels through the optical arrangement will now be described in greater detail with reference to the right-hand part of FIG. 1.

In the example shown, the light 1 with the polarization direction shown in 61 is incident on the input-/output-coupling polarization beam splitter 10 and subsequently has the same polarization direction (see 62). The light 1 now passes through the polarization rotator 15, which can be a half-wave plate through which the polarization direction of the light 1 is rotated through 45°, as shown in 63. As a result of this oblique polarization direction, the light 1 is split at the polarization beam splitter 20 into two partial beams 1A and 1B with mutually perpendicular polarization directions, as shown in 64.

The partial beams 1A and 1B having these two polarization directions that are perpendicular to one another travel on in the direction of the liquid crystal matrix, see 65. The partial beam 1A is rotated through 90° in its polarization direction by the polarization rotator 23, so that both partial beams 1A and 1B have the same polarization direction when they are incident on the liquid crystal matrix 35, see 66. Phase retardations for the partial beams 1A and 1B can now be variably set in dependence on a switching state of the liquid crystal elements of the liquid crystal matrix. In the example shown, the phase of the partial beam 1A is retarded by 180° or half a wavelength (this phase retardation is intended to represent the phase difference to the phase retardation that the other partial beam 1B experiences). As shown in 67, the partial beam 1A now has a phase that is retarded by 180° compared to the partial beam 1B. After passing through the polarization rotator 23 again, the polarization direction of the partial beam 1A is rotated again through 90°, as shown in 68. The two partial beams 1A and 1B are combined at the polarization beam splitter 20, with 69 showing the two polarization directions of the partial beams 1A and 1B and the polarization direction of the resulting outgoing light beam 2. This light beam 2 now has the polarization shown in 70, which is rotated through 135° by the polarization rotator 15, as shown in 71. As shown in 71, the polarization of the light beam 2 is rotated through 90° with respect to the polarization at 62 with which the light 1 travelled in the direction of the liquid crystal matrix. Therefore, the light beam 2 is now not directed at the input-/output-coupling polarization beam splitter 10 in the direction from which the light 1 came. In the example shown, the light 1 was transmitted at the input-/output-coupling polarization beam splitter 10, while the light beam 2 is now reflected because of its rotated polarization direction 2. This light beam 2 coupled out at the input-/output-coupling polarization beam splitter 10 thus has an unchanged light intensity (a maximum light intensity) when the phase of the partial beams 1A and 1B is influenced as shown.

If, on the other hand, the liquid crystal elements on the liquid crystal matrix were set the same for both partial beams 1A and 1B, both partial beams 1A and 1B would have the same polarization/phase in 67 (the polarization of partial beam 1A would not point downward but upward in 67). As a result, the polarization direction of the partial beam 1A in 68 would point to the right rather than to the left, and in 69 and 70, the polarization of the light beam 2 would correspondingly be rotated 90° clockwise compared to the case shown. Consequently, the polarization would be the same as initially for the light 1, and accordingly the light beam 2 would be transmitted at the input-/output-coupling polarization beam splitter 10 in the direction from which the light 1 came. Accordingly, no light would travel in an output-coupling or reflection direction of the input-/output-coupling polarization beam splitter 10 (to the right in FIG. 1) (minimum light intensity).

Thus it is possible using the phase retardations between the liquid crystal regions of the two partial beams to vary an intensity of the coupled-out light beam 2 between a minimum and a maximum intensity. Intensity intermediate values are possible if the phase is not retarded by 180°, as shown in 67, but by a different value. The resulting light beam 2 is then elliptically polarized, wherein the two mutually perpendicular components of the elliptically polarized light beam 2 can be defined at variable magnitudes. As a result, a variably settable part of the light beam can be transmitted at the input-/output-coupling polarization beam splitter 10, and the remaining part can be reflected.

For a mathematical description, the phase retardation/phase pattern $\varphi(x, y)$ with which one of the partial beams is changed when it is incident on the associated liquid crystal region is taken into account. The position dependency $(x, y)$ indicates that different phase retardations $\varphi$ can be set over the cross section of the incident partial beam. The other partial beam is influenced at the other liquid crystal region by a different phase retardation/phase pattern, which differs from the phase retardation $\varphi(x, y)$ by $A(x, y)$.

The two mutually perpendicularly polarized components of the light beam 2 that is incident on the input-/output-coupling polarization beam splitter 10 can be represented as a horizontal field strength component $E_h$ and a vertical field strength component $E_v$. These electric field strengths are dependent on the phase retardation $\varphi(x, y)$ and $A(x, y)$ as follows:

$$E_h(x,y,z) \propto 2 \cos(A(x,y)/2) \cdot \cos(k \cdot z - \omega \cdot t + \varphi(x,y)/2)$$

$$E_v(x,y,z) \propto -2 \sin(A(x,y)/2) \cdot \sin(k \cdot z - \omega \cdot t + \varphi(x,y)/2)$$

Here, z denotes the propagation direction of the light beam, $\omega$ denotes the angular frequency of the light (l of the electromagnetic wave), and k denotes its wavenumber, i.e. $1/\lambda$. Depending on which value $A(x, y)$ has, the light beam downstream of the polarization beam splitter 20 is either linearly polarized in the x or y direction or it is elliptically or circularly polarized. The horizontal component $E_h(x, y, z)$ is returned at the input-/output-coupling polarization beam splitter in the direction of the light source and is no longer used, while the vertical component $E_v(x, y, z)$ is directed at the input-/output-coupling polarization beam splitter in the other direction and used further (that is to say, reflected in FIG. 1). As a result, the light that is used further is linearly polarized and amplitude-modulated and/or phase-modulated.

In the example shown in FIG. 1, the phase of the first partial beam 1A at 67 is shifted by half a wavelength or $\pi$ with respect to the phase of the second partial beam 1B. In this example, therefore $A(x, y)=\pi$. From the above formula it can be seen that $2 \cos(A/2)=0$, that is to say, the portion returning to the light source is $E_h=0$ and all of the light is reflected. In contrast, without a phase difference, $A(x, y)=0$ and therefore $2 \sin(A/2)=0$ and thus $E_v=0$, i.e. no light is passed on, but all light is transmitted in the direction of the light source.

It should be noted that the polarization directions indicated in FIG. 1 refer to a single liquid crystal element of the first liquid crystal region 35A and a single liquid crystal element of the second liquid crystal region 35B. These two liquid crystal elements correspond to one another with regard to the cross sections of the incident partial beams, so that the light returning from these two liquid crystal elements is spatially superposed. In the above formulas, these two liquid crystal elements have the same x-value and the same y-value. Other phase retardations can be set for other liquid crystal elements, with the result that a varying intensity can be set over the beam cross section of the coupled-out light beam 2.

In addition to this intensity modulation, phase modulation can take place by setting neighboring pixels of the same liquid crystal region differently. A wavefront can thus be variably set.

In the embodiment described, the liquid crystal regions 35A, 35B can also be understood more generally as liquid crystal regions or lifting mirror regions 35A, 35B. In the case of a design as lifting mirror regions 35A, 35B, reference numeral 35 denotes a lifting mirror matrix, and mirrors are present rather than liquid crystal elements. In such a design, the polarization rotator 23 can be dispensed with. Otherwise, the construction can be implemented as illustrated in FIG. 1. Without a polarization rotator 23, the lifting micromirror region 35A can, for example, bring about a change in polarization of the partial beam 1A from an alignment as shown in the image region 65 directly to an alignment as shown in the image region 68 (that is to say, in this example, the phase of the partial beam 1A is changed by half a wavelength by the lifting micromirror region 35A).

The invention allows both an amplitude and a phase of a light beam to be shaped variably over its cross section. This is done with a compact and stable arrangement that is also particularly cost-effective when using a single liquid crystal matrix or lifting micromirror matrix.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Light
1A First partial beam
1B Second partial beam
2 Outgoing light beam
10 Input-/output-coupling polarization beam splitter
15 Polarization rotator
20 Polarization beam splitter
21 Interface
22 Retardation element
23 Polarization rotator
35 Liquid crystal matrix or lifting micromirror matrix
35A First liquid crystal region or lifting micromirror region
35B Second liquid crystal region or lifting micromirror region
61-71 Details regarding the polarization direction of the light 1, of the partial beams 1A, 1B, and of the outgoing light beam 2

What is claimed is:

1. An optical arrangement for light beam shaping for a light microscope, comprising
a first liquid crystal region or lifting micromirror region with a plurality of independently adjustable liquid crystal elements or mirrors with which a phase of incident light is changeable in a settable manner;
a second liquid crystal region or lifting micromirror region with a plurality of independently adjustable liquid crystal elements or mirrors, with which a phase of incident light is changeable in a settable manner;
an input-/output-coupling polarization beam splitter to direct incident light of a specific polarization direction in a direction of the liquid crystal regions or lifting micromirror regions;
a polarization beam splitter, which is arranged between the input-/output-coupling polarization beam splitter and the liquid crystal regions or lifting micromirror regions such
that the polarization beam splitter separates the light coming from the input-/output-coupling polarization beam splitter, depending on a polarization, into a first partial beam, which is directed to the first liquid crystal region or lifting micromirror region, and into a second partial beam, which is directed to the second liquid crystal region or lifting micromirror region; and
that the polarization beam splitter combines the two partial beams returning from the liquid crystal regions or lifting micromirror regions and directs them together to the input-/output-coupling polarization beam splitter as an outgoing light beam.

2. The optical arrangement as claimed in claim 1, wherein
the first and second liquid crystal regions or lifting micromirror regions are regions of a liquid crystal matrix or lifting micromirror matrix; and
a polarization rotator is arranged between the polarization beam splitter and the first liquid crystal region or lifting micromirror region or between the polarization beam splitter and the second liquid crystal region or lifting micromirror region.

3. The optical arrangement as claimed in claim 1, further comprising
a transparent retardation element which is arranged between the polarization beam splitter and the first liquid crystal region or lifting micromirror region or between the polarization beam splitter and the second liquid crystal region or lifting micromirror region; and
wherein the retardation element is designed such that an optical path length from the polarization beam splitter to the first liquid crystal region or lifting micromirror region is equal to an optical path length from the polarization beam splitter to the second liquid crystal region or lifting micromirror region.

4. The optical arrangement as claimed in claim 1, wherein
a beam path from the polarization beam splitter to the first liquid crystal region or lifting micromirror region is designed such that the first partial beam is incident perpendicularly on the first liquid crystal region or lifting micromirror region and travels back to the polarization beam splitter along said beam path from the polarization beam splitter to the first liquid crystal region or lifting micromirror region;
a beam path from the polarization beam splitter to the second liquid crystal region or lifting micromirror region is designed such that the second partial beam is incident perpendicularly on the second liquid crystal region or lifting micromirror region and travels back to the polarization beam splitter along said beam path from the polarization beam splitter to the second liquid crystal region or lifting micromirror region.

5. The optical arrangement as claimed in claim 1, wherein
the polarization beam splitter is designed such that the first and second partial beams travel parallel to one another toward the liquid crystal regions or lifting micromirror regions.

6. The optical arrangement as claimed in claim 2, wherein
at least two, or all, of the following components are in direct contact: the polarization beam splitter, the polarization rotator, the liquid crystal matrix or lifting micromirror matrix, and a transparent retardation element.

7. The optical arrangement as claimed in claim 1, wherein
a front polarization rotator is arranged between the input-/output-coupling polarization beam splitter and the polarization beam splitter and is oriented such that light is separated at the polarization beam splitter into the first and second partial beams in equal proportions.

8. The optical arrangement as claimed in claim 1, wherein
a phase retardation by which a phase of incident light is influenced is settable individually for each liquid crystal element or each mirror;
the optical arrangement further comprising a control unit for setting a light intensity to be output, the control unit being configured to set a phase difference between a phase retardation that is generated by a liquid crystal element or a mirror of the first liquid crystal region or lifting micromirror region and a phase retardation that is generated by a corresponding liquid crystal element or a corresponding mirror of the second liquid crystal region or lifting micromirror region, wherein:
for a maximum light intensity, the phase difference is set to half a light wavelength, or an integer multiple of the light wavelength plus half a light wavelength, as a result of which the outgoing light beam has a polarization direction that is rotated through 90° compared to the incoming light and is therefore not directed at the input-/output-coupling polarization beam splitter in the direction from which the incoming light has come,
for a minimum light intensity, the phase difference is set to 0 or an integer multiple of the light wavelength, with the result that the outgoing light beam has the same polarization direction as the incoming light and is thus directed at the input-/output-coupling polarization beam splitter in the direction from which the incoming light has come.

9. The optical arrangement as claimed in claim 1, wherein a phase retardation by which a phase of incident light is influenced is settable individually for each liquid crystal element or each mirror;
further comprising a control unit for setting a phase pattern over a beam cross section, the control unit being configured to set different phase retardations with the liquid crystal elements or mirrors of the same liquid crystal region or lifting micromirror region.

10. The optical arrangement as claimed in claim 9, wherein for setting an intensity pattern and a phase pattern, the control unit is configured:
to set at the liquid crystal elements/mirrors of the first liquid crystal region or lifting micromirror region mutually different phase retardations, which together help form the phase pattern;
to set at the liquid crystal elements/mirrors of the second liquid crystal region or lifting micromirror region phase retardations that are composed of:
A) phase retardations that correspond to those of the liquid crystal elements/mirrors of the first liquid crystal region or lifting micromirror region for forming the phase pattern; and
B) phase differences to the respective phase retardations of the first liquid crystal region or lifting micromirror region for forming the intensity pattern.

11. A light microscope having an optical arrangement as claimed in claim 1.

12. A method for light beam shaping for a light microscope, comprising
phase-modulating light by means of a liquid crystal matrix or lifting micromirror matrix, which has a plurality of independently switchable liquid crystal elements or mirrors;
guiding light of a specific polarization direction by means of an input-/output-coupling polarization beam splitter;
splitting the light coming from the input-/output-coupling polarization beam splitter in a polarization-dependent manner into a first partial beam and into a second partial beam by means of a polarization beam splitter;
wherein the phase modulation of light by means of a liquid crystal matrix or lifting micromirror matrix comprises:
directing the first partial beam to a first liquid crystal region or lifting micromirror region of the liquid crystal matrix or lifting micromirror matrix; and
directing the second partial beam to a second liquid crystal region or lifting micromirror region; and
combining the two partial beams returning from the liquid crystal regions or lifting micromirror regions by means of the polarization beam splitter; and
directing the combined partial beams as an outgoing light beam to the input-/output-coupling polarization beam splitter.

* * * * *

UNITED STATES PATENT AND TRADEMARK OFFICE
CERTIFICATE OF CORRECTION

PATENT NO. : 11,892,618 B2
APPLICATION NO. : 17/045701
DATED : February 6, 2024
INVENTOR(S) : Jörg Siebenmorgen, Ingo Kleppe and Ralf Netz It is certified that error appears in the above-identified patent and that said Letters Patent is hereby corrected as shown below:

In the Specification

Column 9, Line 53   Now reads: "$E_h(x,y,z) \propto 2\ cos(A(x,y)/2) \cdot cos(k \cdot z - \omega \cdot t + \varphi(x,y)/2)$"
Should read: -- $E_h(x,y,z) \propto 2cos(A(x,y)/2) \cdot cos(k \cdot z - \omega \cdot t + \varphi(x,y)/2)$ --

Column 9, Line 56   Now reads: "$E_v(x,y,z) \propto -2\ sin(A(x,y)/2) \cdot sin(k \cdot z - \omega \cdot t + \varphi(x,y)/2)$"
Should read: -- $E_v(x,y,z) \propto -2sin(A(x,y)/2) \cdot sin(k \cdot z - \omega \cdot t + \varphi(x,y)/2)$ --

Column 9, Lines 58-59   Now reads: "the angular frequency of the light (I of the electromagnetic wave)"
Should read: -- the angular frequency of the light (/ of the electromagnetic wave) --

Column 10, Line 10   Now reads: "2 cos(A/2)=0"
Should read: -- 2cos(A/2)=0 --

Column 10, Line 13   Now reads: "2 sin(A/2)=0"
Should read: -- 2sin(A/2)=0 --

Signed and Sealed this
Eleventh Day of June, 2024

Katherine Kelly Vidal
*Director of the United States Patent and Trademark Office*